United States Patent
Ossareh et al.

(10) Patent No.: US 10,107,184 B2
(45) Date of Patent: Oct. 23, 2018

(54) METHOD AND SYSTEM FOR WASTEGATE CONTROL

(71) Applicant: Ford Global Technologies, LLC, Dearborn, MI (US)

(72) Inventors: Hamid-Reza Ossareh, South Burlington, VT (US); Baitao Xiao, Canton, MI (US); Mrdjan J. Jankovic, Birmingham, MI (US); David G. Hagner, Beverly Hills, MI (US); Julia Helen Buckland, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 142 days.

(21) Appl. No.: 15/257,800

(22) Filed: Sep. 6, 2016

(65) Prior Publication Data
US 2018/0066575 A1    Mar. 8, 2018

(51) Int. Cl.
*F02B 37/18* (2006.01)

(52) U.S. Cl.
CPC ...... *F02B 37/183* (2013.01); *F05B 2270/404* (2013.01)

(58) Field of Classification Search
CPC .................... F02B 37/183; F05B 2270/404
USPC ....................................................... 60/602
See application file for complete search history.

(56) References Cited

U.S. PATENT DOCUMENTS

| | | | |
|---|---|---|---|
| 5,748,467 A | | 5/1998 | Qin et al. |
| 5,816,047 A | * | 10/1998 | Zurlo ............... F02B 37/18 60/602 |
| 6,012,289 A | * | 1/2000 | Deckard ............ F02B 37/18 60/602 |
| 6,161,384 A | * | 12/2000 | Reinbold ........... F02B 37/12 60/602 |
| 7,926,270 B2 | | 4/2011 | Weaver et al. |
| 8,255,066 B2 | | 8/2012 | Boiko et al. |
| 8,572,961 B2 | | 11/2013 | Kamik et al. |
| 2011/0088390 A1 | | 4/2011 | Panciroli et al. |
| 2014/0260241 A1 | * | 9/2014 | Jankovic ........... F02M 25/077 60/602 |
| 2016/0108800 A1 | * | 4/2016 | Wang ................ F02D 41/1401 60/602 |
| 2016/0131057 A1 | * | 5/2016 | Lahti ................ F02D 41/0077 701/103 |
| 2016/0131089 A1 | * | 5/2016 | Lahti ................ F02D 41/0007 60/605.2 |
| 2016/0215685 A1 | * | 7/2016 | Flavin ............... F02B 37/183 |
| 2018/0066575 A1 | * | 3/2018 | Ossareh ............ F02B 37/183 |
| 2018/0073450 A1 | * | 3/2018 | Hojo ................ F02D 41/0007 |

* cited by examiner

*Primary Examiner* — Jason Newton
(74) *Attorney, Agent, or Firm* — Julia Voutyras; McCoy Russell LLP (57) ABSTRACT

Methods and systems are provided for controlling a wastegate coupled to a turbine. In one example, a method may include during steady engine operation, actuating a wastegate to introduce an oscillation in boost pressure, and updating gain of a wastegate feedback controller responsive to the oscillation in boost pressure.

15 Claims, 6 Drawing Sheets

METHOD AND SYSTEM FOR WASTEGATE CONTROL

FIELD

The present description relates generally to methods and systems for controlling a wastegate with a wastegate feedback controller, wherein parameters of the wastegate feedback controller may be updated during engine operation by inducing an oscillation in boost pressure.

BACKGROUND/SUMMARY

Internal combustion engines may be downsized to improve fuel economy. In order to achieve high engine peak power, turbochargers may be utilized to increase boost pressure. In one example, a turbocharger may include a compressor and a turbine connected by a drive shaft, where the turbine is coupled to an exhaust manifold side of the engine, and the compressor is coupled to an intake manifold side of the engine. A throttle may be positioned between the compressor and the intake manifold for controlling airflow into the engine intake manifold. The boost pressure may be controlled by adjusting the amount of exhaust gas reaching the turbine, for example with a wastegate. In response to a torque demand, an engine control system may compute a desired throttle inlet pressure and send it to the wastegate feedback controller. Within the wastegate feedback controller, a wastegate command may be generated to actuate the wastegate. In an example, the wastegate feedback controller may be a proportional-integral-derivative (PID) controller with feedforward action. Gains of the proportional, integral, and derivative term of the PID controller need to be tuned for the engine system. However, determining the gains of the PID controller may be an arduous task because controller gains depend on the operating conditions such as air flow through the engine, turbine speed, and barometric pressure.

Other attempts to determine PID controller gain include tuning the controller through relay feedback. One example approach is shown by Boiko et al. in U.S. Pat. No. 8,255,066B2. Therein, oscillations corresponding to a selected gain or phase margin are generated, and PID controller tuning parameters are computed based on the amplitude and frequency of the oscillations. Further, the prior art's method is "non-parametric" because it does not attempt to estimate any plant (process) model parameters.

However, the inventors herein have recognized the above issues as well as other potential issues with such systems. As one example, the procedure for determining PID tuning parameters is complicated and may be time consuming and do not provide a straightforward approach to trading off speed of response and robustness. Further, controller parameters may need to be updated during extensive vehicle calibration process to account for late hardware changes or part-to-part variability or after the original in-factory calibration due to system degradation over time.

In one example, the issues described above may be addressed by a method for an engine system, comprising: during steady engine operation, inducing a boost pressure oscillation by actuating a wastegate, and compensating a manifold air pressure with a corresponding throttle oscillation; and updating a gain of a wastegate feedback controller based on the boost pressure oscillation. For example, the gains may be updated during engine operation based on parameters describing the measured boost pressure oscillation, such as amplitude, frequency, etc. In this way, the gain of the wastegate feedback controller may be updated online while the engine is running.

As one example, a wastegate may be controlled by a wastegate feedback controller in the form of a PID controller. During steady engine operation, a boost pressure oscillation of small amplitude may be induced by oscillating a wastegate position. The boost pressure may be a throttle input pressure or a compressor outlet pressure. For a diesel engine, the boost pressure may be the intake manifold pressure. As a non-limiting example, the boost pressure is herein referred to as a throttle input pressure (TIP). In response to the TIP oscillation, a throttle may be oscillated to maintain a constant manifold air pressure. In another embodiment, in hybrid applications, the electric motor or a generator might be used to suppress the impact of throttle inlet pressure oscillations on torque output. PID controller gains may be updated as a mathematical function of the frequency, amplitude, and phase of the boost pressure oscillation. By updating the wastegate feedback controller gain over time, boost pressure may be robustly controlled with tolerance for vehicle component degradation. By determining the gain of the wastegate feedback controller during steady engine operation, wastegate feedback controller gain may be updated with reduced interruption to engine operation.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
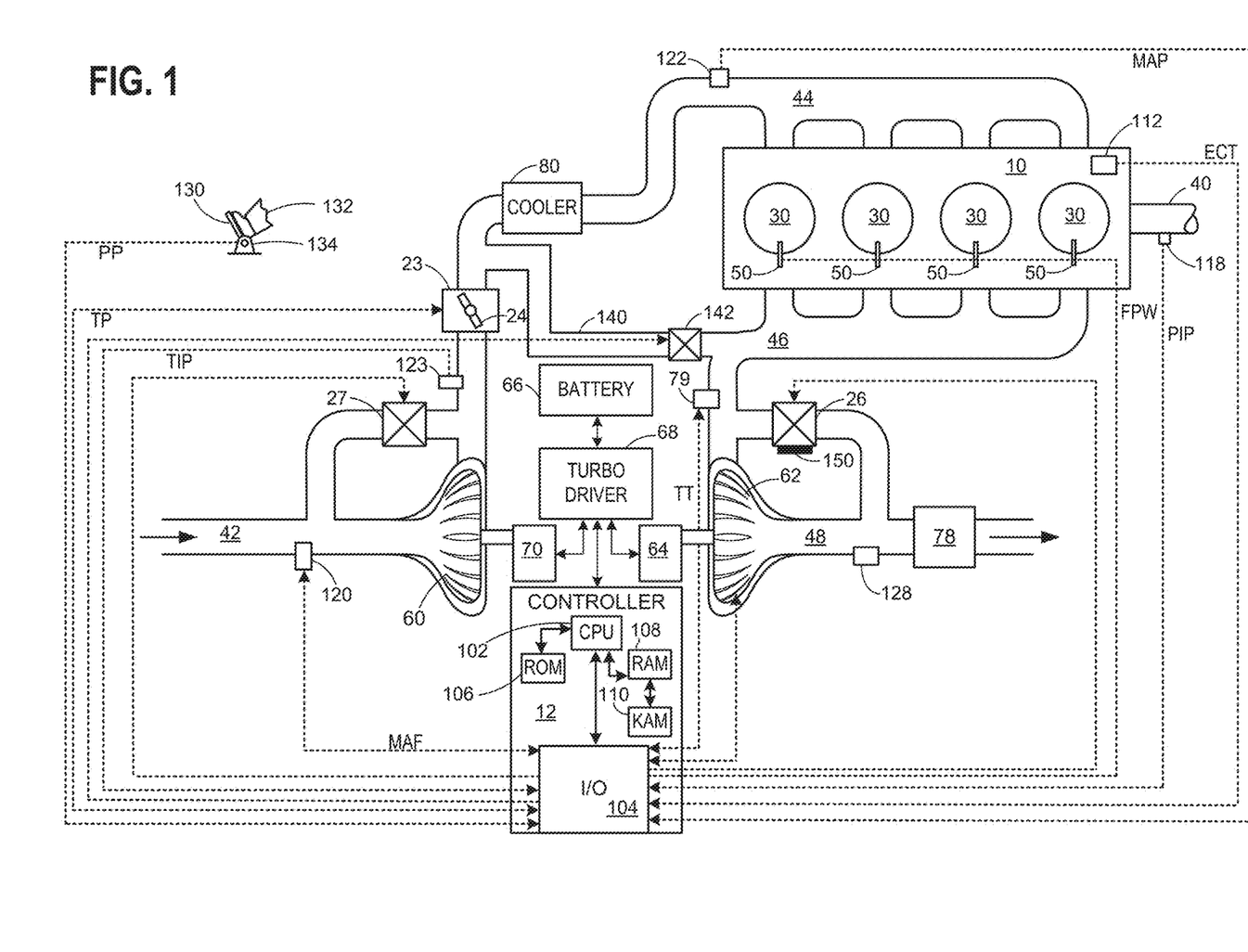
FIG. 1 shows a block diagram of an example turbocharged engine including a wastegate.
Figure 2:
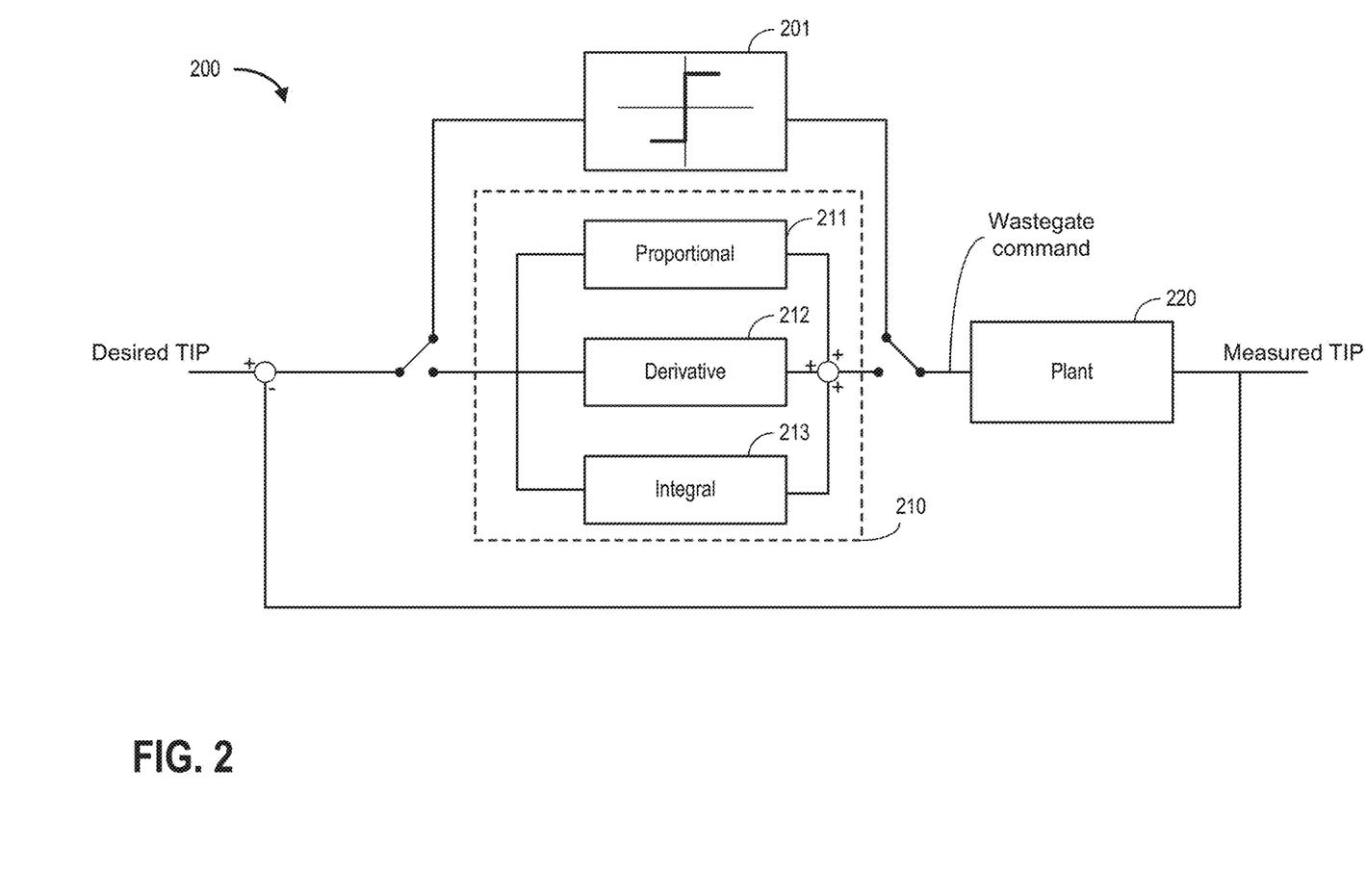
FIG. 2 shows a block diagram of an example wastegate feedback controller.
Figure 3:
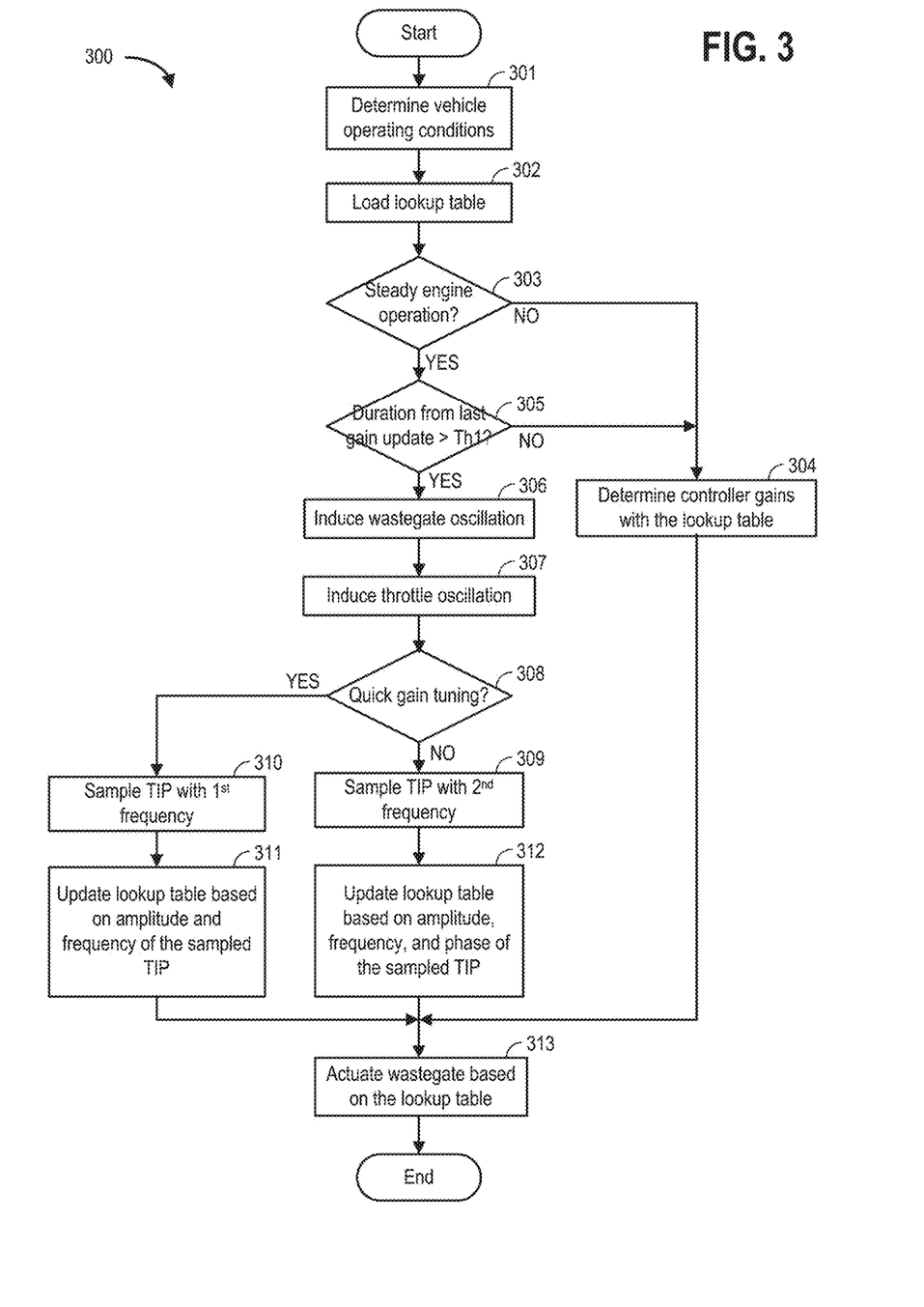
FIG. 3 shows an example method for updating parameters of a wastegate feedback controller.
Figure 4:
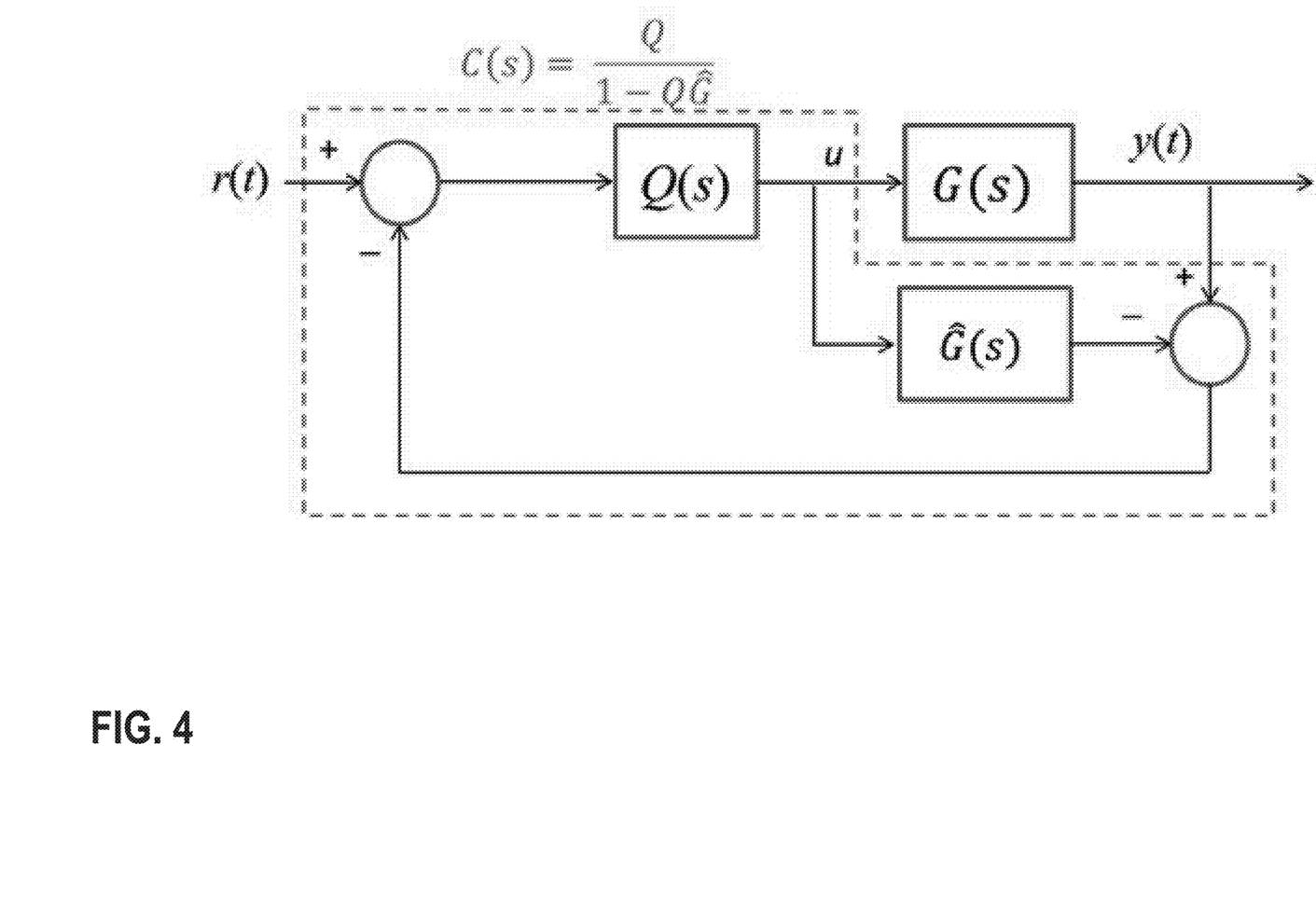
FIG. 4 shows an example internal model control structure.
Figure 5:
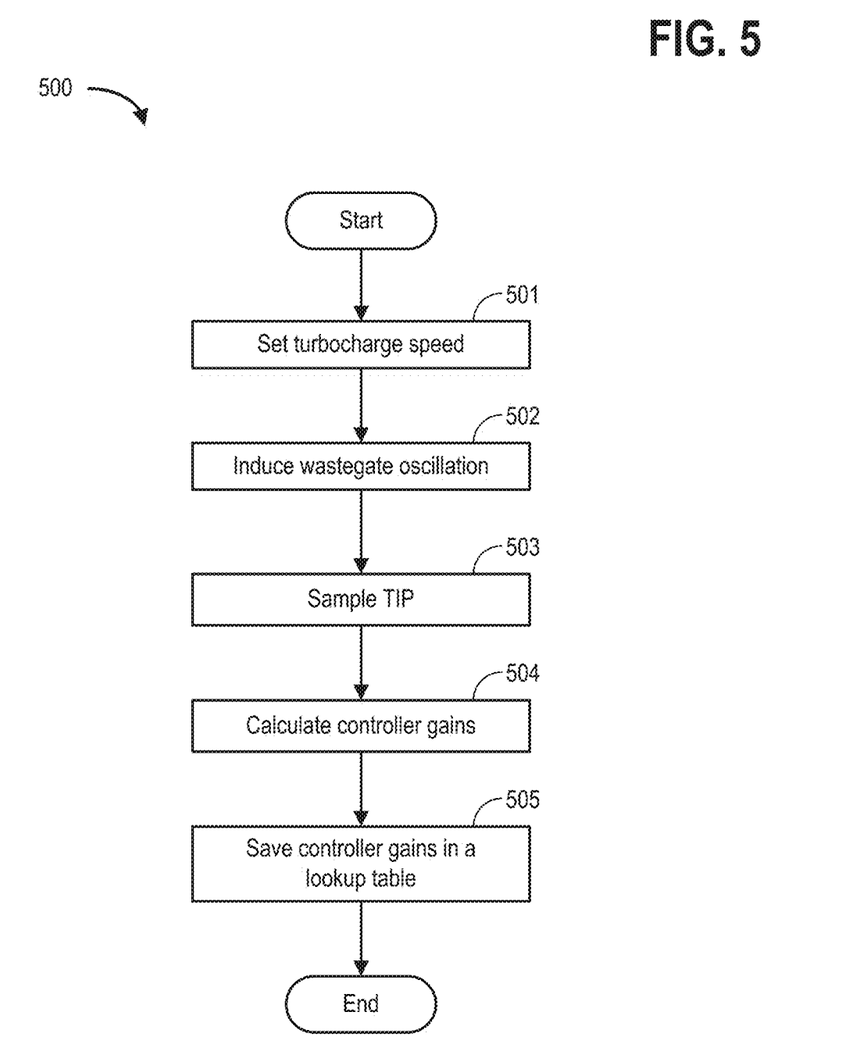
FIG. 5 shows an example method for calibrating a wastegate feedback controller.
Figure 6:
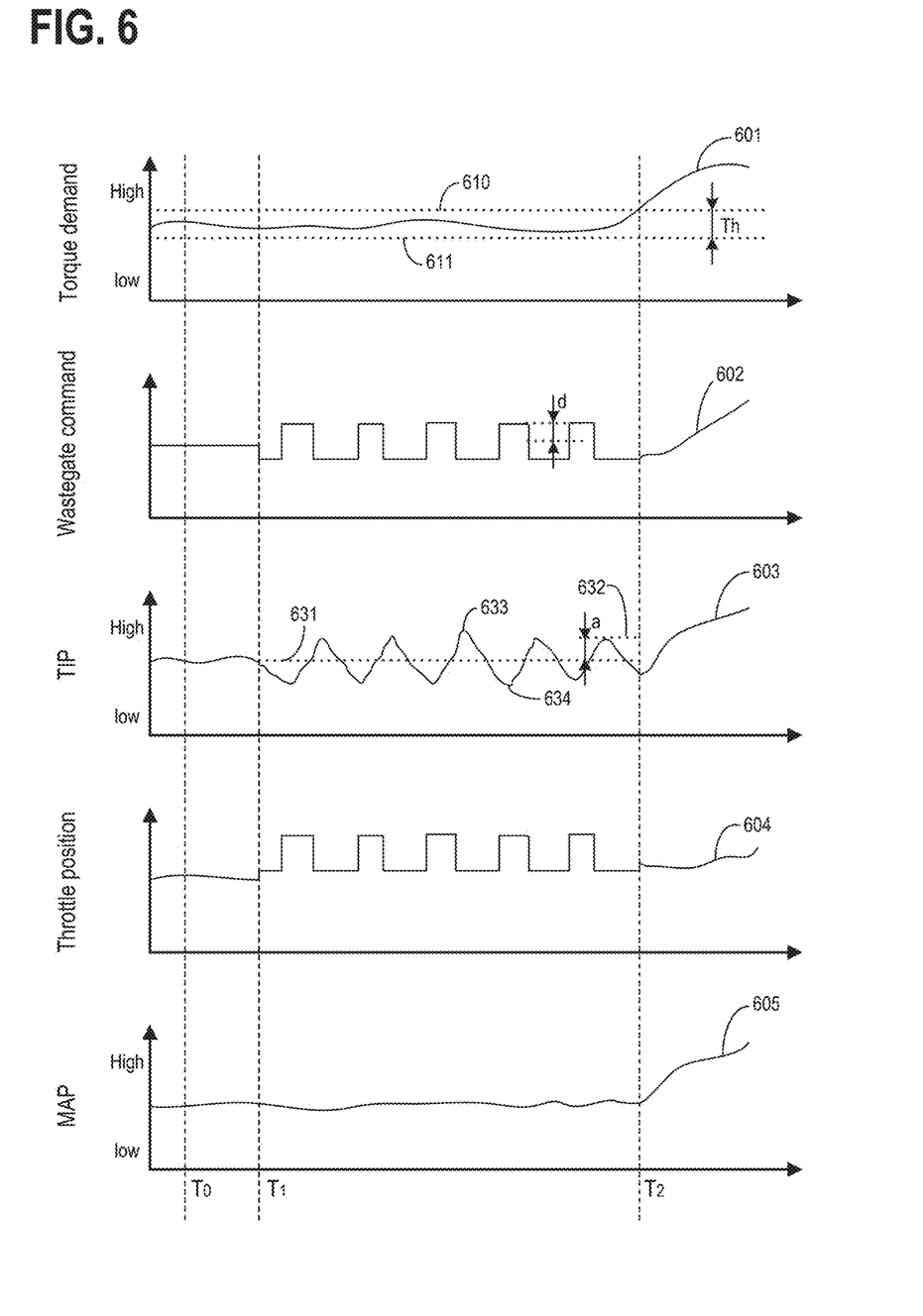
FIG. 6 shows time lines illustrating various engine parameters while implementing the example method.

The following description relates to systems and methods for controlling a wastegate of a turbocharged engine, such as the turbocharged engine shown in FIG. 1. The wastegate position may be controlled via a wastegate feedback controller. FIG. 2 shows a block diagram of an example wastegate feedback controller. The wastegate feedback controller may include a PID controller with controller gain tuned through relay feedback. Since the desired controller gain may vary among vehicles due to part-to-part variation and may drift over time due to system degradation, controller gain may need to be updated after the initial in factory calibration. FIG. 3 shows an example method of updating controller gain through relay feedback. Specifically, during engine operation, an oscillation in boost pressure may be induced by actuating the wastegate with a square wave wastegate command. The wastegate feedback controller gain may be derived from the measured frequency, amplitude, and/or phase of the boost pressure oscillation based on Internal Model Control (IMC). FIG. 4 shows an example IMC structure. FIG. 5 demonstrates an example method of in factory calibration of the wastegate feedback controller gain. FIG. 6 illustrates the variation of engine parameters while updating the wastegate feedback controller gain during engine operation.

FIG. 1 is a schematic diagram showing an example engine 10, which may be included in a propulsion system of an automobile. The engine 10 is shown with four cylinders 30. However, other numbers of cylinders may be used in accordance with the current disclosure. Engine 10 may be controlled at least partially by a control system including engine controller 12, and by input from a vehicle operator 132 via an input device 130. In this example, input device 130 includes an accelerator pedal and a pedal position sensor 134 for generating a proportional pedal position signal PP. Each combustion chamber (e.g., cylinder) 30 of engine 10 may include combustion chamber walls with a piston (not shown) positioned therein. The pistons may be coupled to a crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel to enable a starting operation of engine 10.

Combustion chambers 30 may receive intake air from intake manifold 44 via intake passage 42 and may exhaust combustion gases via exhaust passage 48. Intake manifold 44 and exhaust manifold 46 can selectively communicate with combustion chamber 30 via respective intake valves and exhaust valves (not shown). In some embodiments, combustion chamber 30 may include two or more intake valves and/or two or more exhaust valves.

Fuel injectors 50 are shown coupled directly to combustion chamber 30 for injecting fuel directly therein in proportion to the pulse width of signal FPW received from engine controller 12. In this manner, fuel injector 50 provides what is known as direct injection of fuel into combustion chamber 30. The fuel injector may be mounted in the side of the combustion chamber or in the top of the combustion chamber, for example. Fuel may be delivered to fuel injector 50 by a fuel system (not shown) including a fuel tank, a fuel pump, and a fuel rail. In some embodiments, combustion chambers 30 may alternatively, or additionally, include a fuel injector arranged in intake manifold 44 in a configuration that provides what is known as port injection of fuel into the intake port upstream from each combustion chamber 30.

Intake passage 42 may include throttle 23 having throttle plate 24, respectively. In this particular example, the position of throttle plate 24 may be varied by engine controller 12 via signals provided to an actuator included with throttle and 23. In one example, the actuators may be electric actuators (e.g., electric motors), a configuration that is commonly referred to as electronic throttle control (ETC). In this manner, throttle 23 may be operated to vary the intake air provided to combustion chamber 30 among other engine cylinders. The position of throttle plate 24 may be provided to engine controller 12 by throttle position signal TP. Intake passage 42 may further include a mass air flow sensor 120, a manifold air pressure sensor 122, and a throttle inlet pressure sensor 123 for providing respective signals MAF (mass airflow) MAP (manifold air pressure) to engine controller 12.

Exhaust passage 48 may receive exhaust gases from cylinders 30. Exhaust gas sensor 128 is shown coupled to exhaust passage 48 downstream of turbine 62 and upstream of emission control device 78. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO, a NOx, HC, or CO sensor, for example. Emission control device 78 may be a three way catalyst (TWC), NOx trap, various other emission control devices, or combinations thereof.

Exhaust temperature may be measured by one or more temperature sensors (not shown) located in exhaust passage 48. Alternatively, exhaust temperature may be inferred based on engine operating conditions such as speed, load, air-fuel ratio (AFR), spark retard, etc.

Engine controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Engine controller 12 may receive various signals from sensors coupled to engine 10, in addition to those signals previously discussed, including measurement of inducted mass air flow (MAF) from mass air flow sensor 120; engine coolant temperature (ECT) from temperature sensor 112, shown schematically in one location within the engine 10; throttle input pressure (TIP) from sensor 123; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by engine controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft 40. In some examples, storage medium read-only memory 106 may be programmed with computer readable data representing instructions executable by processor 102 for performing the methods described below as well as other variants that are anticipated but not specifically listed.

Engine 10 may further include a compression device such as a turbocharger including at least a compressor 60 arranged along intake manifold 44. Compressor 60 may be driven by a turbine 62, via, for example a shaft, or other coupling arrangement. The turbine 62 may be arranged along exhaust passage 48 and communicate with exhaust gasses flowing therethrough. Sensor 123 may be disposed in intake manifold 44 for measuring the throttle input pressure and providing a TIP signal to engine controller 12.

Exhaust passage 48 may include wastegate 26 coupled to turbine 62 for diverting exhaust gas away from turbine 62. In some embodiments, wastegate 26 may be a multi-staged wastegate, such as a two-staged wastegate with a first stage configured to control boost pressure and a second stage configured to increase heat flux to emission control device 78. Wastegate 26 may be operated with an actuator 150, which may be an electric actuator such as an electric motor, for example, though pneumatic actuators are also used. Intake passage 42 may include a compressor bypass valve 27 configured to divert intake air around compressor 60. Wastegate 26 and/or compressor bypass valve 27 may be controlled by engine controller 12 via actuators (e.g., actuator 150) to be opened when a lower boost pressure is desired, for example.

Intake passage 42 may further include charge air cooler (CAC) 80 (e.g., an intercooler) to decrease the temperature of the turbocharged or supercharged intake gases. In some embodiments, charge air cooler 80 may be an air to air heat exchanger. In other embodiments, charge air cooler 80 may be an air to liquid heat exchanger.

Further, in the disclosed embodiments, an exhaust gas recirculation (EGR) system may route a desired portion of exhaust gas to a location between throttle 23 and CAC 80 via EGR passage 140. The amount of EGR provided to intake passage 42 may be varied by engine controller 12 via EGR valve 142. Further, an EGR sensor (not shown) may be arranged within the EGR passage and may provide an indication of one or more of pressure, temperature, and concentration of the exhaust gas. FIG. 1 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger.

The engine controller 12 receives signals from the various sensors of FIG. 1 and employs the various actuators of FIG. 1 to adjust engine operation based on the received signals and instructions stored on a memory of the controller. As an example, adjusting manifold air pressure may include adjusting the actuator of the throttle to adjust throttle opening. As another example, adjusting throttle input pressure may include adjusting the actuator of the wastegate to adjust the wastegate position.

Turning to FIG. 2, an example block diagram of a wastegate feedback controller 200 is demonstrated. The wastegate feedback controller 200 may be part of the engine controller 12. In other words, the wastegate feedback control mechanism may be implemented through engine controller 12. The wastegate feedback controller has a desired and measured TIP as input, and a wastegate command as an output. The TIP may be measured via a sensor coupled between a compressor and a throttle (such as pressure sensor 123 in FIG. 1). The wastegate feedback controller may include a PID controller 210. PID controller 210 may take a TIP error (i.e., difference between the desired TIP and the measured TIP) as input, and send a wastegate command to plant 220. Plant 220 herein represents an engine process with an input of a wastegate command and an output of a throttle input pressure. Within plant 220, the wastegate command may be send to a wastegate actuator (e.g. wastegate actuator 150 in FIG. 1) to adjust the wastegate position. The variation in wastegate position cause oscillation in TIP. The TIP may be measured and feedback to the input to be compared with the desired TIP.

PID controller 210 includes three terms: proportional 211, derivative 212, and integral 213. Each of the three terms has a corresponding gain. The gains depend on operating parameters such as engine air flow, turbocharger speed, and ambient pressure. In order to determine (i.e., tune) the controller gain, plant 220 may alternatively be connected to a relay function 201. The relay function 201 may take the TIP error as an input, and outputs a wastegate command in the form of a switching rectangular wave. Such wastegate command may induce oscillation in wastegate position. Consequently, the TIP at the output of plant 220 may oscillate. The TIP oscillation may be used to characterize the dynamics of plant 220. An example method of determining control gains of controller 210 is demonstrated in detail in FIG. 3 and FIG. 5.

Due to system degradation over time, desired controller gain may drift. FIG. 3 shows an example method 300 of updating controller gain during engine operation. For example, during steady engine operation, the wastegate actuator may receive signal from a relay function (e.g. relay function 201 in FIG. 2) instead of a PID controller (e.g. PID controller 210 in FIG. 2). Method 300 may then determine an updated PID controller gain by analyzing the sampled TIP signal.

Instructions for carrying out method 300 and the rest of the methods included herein may be executed by an engine controller based on instructions stored in a memory of the engine controller and in conjunction with signals received from sensors of the engine system, such as the sensors described above with reference to FIG. 1. The engine controller may employ engine actuators of the engine system to adjust engine operation, according to the methods described below.

At step 301, vehicle operating conditions are determined by an engine controller (such as engine controller 12 in FIG. 2). The engine controller acquires measurements from various sensors in the engine system and estimates operating conditions including engine load, engine speed, TIP, MAP, vehicle torque demand, turbocharger speed, wastegate position, and throttle position.

At step 302, method 300 loads a lookup table for determining controller gains of a wastegate feedback controller (such as controller 210 in FIG. 1). As an example, the lookup table may be pre-determined and stored in the non-transitory memory of the engine controller (such as engine controller 12 in FIG. 1). As another example, the lookup table may be in factory calibrated for each vehicle. An example method of in factory calibration of the lookup table is presented in FIG. 5. In one embodiment, the lookup table stores turbocharger speed and corresponding wastegate feedback controller gain. As an example, based on the turbocharger speed estimated in step 301, method 300 determines gains for each term of a PID controller. As another example, the proportional, derivative, and integral gains of the PID controller may decrease with increased turbocharger speed. As yet another example, the wastegate feedback controller gains may be acquired via interpolating the turbocharger speed stored in the lookup table.

At step 303, method 300 determines whether the engine is in steady engine operation. As an example, the engine may be in steady engine operation if the variation of torque demand is within a threshold over a predetermined time period. In conventional powertrains, torque variation will be small if the driver demand is relatively constant such as during steady cruise with little grade variation. In mild, series, or parallel hybrids, engine is often operated at a steady torque demand, typically tied to high operating efficiency, for extended periods of time regardless of driver demand. Another example of steady state operation is that the rate of change of the estimated or measured engine airflow is within a predetermined band, which may be accomplished by applying a high-pass filter to the engine airflow signal and comparing the filtered output to a threshold. If the vehicle is not in steady engine operation, method may move to step 304, wherein the wastegate is controlled by the wastegate feedback controller, with controller gains determined based on the lookup table loaded in step 302. Otherwise, if the engine is during steady engine operation, method 300 moves to step 305.

At step 305, method 300 may compare time duration from the most recent wastegate feedback controller gain update with a pre-determined time duration Th1. The time duration Th1 may relate to the condition of the engine system. For example, Th1 may be a predicated time duration when wastegate degradation may happen. If the lookup table has not been updated for a time longer than Th1, method 300 moves to step 306. Otherwise, method 300 moves to step 304 and use the controller gains stored in the loaded lookup table for wastegate control. In one embodiment, there may be one timer and one pre-determined time duration Th1. In another embodiment, the time for which a subset of the lookup table has not been updated may be a vector of times, each corresponding to a subset of engine operating conditions. As such, the controller may not update a first subset of the lookup table because its timer has not exceeded the pre-determined time duration Th1, but update a second subset of the lookup table when those conditions are matched, since the second subset's timer has exceeded Th1 due to not being updated as recently as the first subset's timer. By updating the lookup table over a pre-determined time period, drift of the desired wastegate feedback controller gains may be compensated for improved boost pressure control.

At step 306, method 300 induces an oscillation in wastegate position by actuating the wastegate through a relay function (such as relay function 201 in FIG. 2). The relay function may be in the form of a switching rectangular wave. Consequently, the wastegate position may oscillate, which leads to an oscillation in TIP. In an example, while the wastegate is actuated by the relay function, EGR flow may be stopped by closing EGR valve (such as EGR valve 142 in FIG. 2). Further, the compressor bypass valve (such as CRV valve 27 in FIG. 2) may be closed. In this way, the TIP oscillation is induced solely by the oscillation of wastegate position.

At step 307, method 300 actuates the throttle (such as throttle 24 in FIG. 1) to induce an oscillation in the throttle position. The throttle may be oscillated to compensate for the variation in MAP that would otherwise be induced by the TIP oscillation, so that a relatively constant MAP may be achieved. In this way, drivability of vehicle may be less affected during the process of controller gain tuning. In one example, the throttle opening may increase responsive to an increase in the wastegate opening. In one embodiment, the oscillation of the throttle may be determined based on the wastegate command. As an example, the throttle may be actuated at a same frequency and phase as the wastegate command. As another example, the throttle may be actuated responsive to a measured wastegate position. In another embodiment, the oscillation of the throttle may be determined responsive to the TIP. For example, engine controller 12 may sense TIP via a sensor and calculate corresponding throttle position necessary to keep a constant MAP. In yet another embodiment, the oscillation of the throttle may be determined responsive to the MAP. For example, engine controller 12 may sense MAP via a sensor and determine corresponding throttle position to offset the fluctuation in MAP. In another embodiment, in hybrid powertrain applications, the vehicle system may use an electric motor or a generator to compensate impact of TIP oscillation on engine torque output. For example, torque generated by the electric motor or generator may be oscillated to maintain a constant vehicle torque output.

At step 308, method 300 determines whether to tune the gain through a quick gain tuning process through steps 310 and 311, or a more time consuming and resource consuming tuning process through steps 309 and 312. As an example, method 300 may choose the quick gain tuning if it is predicted that engine operation condition may end in a short time. As another example, method 300 may choose the quick gain tuning if the time duration from the most recent update of the wastegate feedback controller gain is shorter than a threshold Th2, wherein Th2 is longer than threshold Th1 of step 305.

At step 310, the TIP oscillation is sampled with a first frequency. For example, the TIP is sampled by a sensor coupled upstream of the throttle (such as sensor 123 in FIG. 1). Then, at step 311, the wastegate feedback controller gain may be updated based on the frequency and amplitude of the sampled TIP oscillation. In an embodiment, the frequency of TIP oscillation may be determined based on zero-crossings of the TIP oscillation, and amplitude of TIP oscillation may be determined based on peaks of the sensed TIP signal. In another embodiment, as shown in FIG. 6, peaks 633 and 634 (i.e., local maximum and minimum) of the TIP oscillation may be determined. A zero position 631 may be determined based on the peaks. For example, the zero position may be determined by taking a running average of the peaks. Frequency and phase of the TIP oscillation may be determined by tracking the zero-crossings of the TIP signal over time. Amplitude of the TIP oscillation may be determined by the difference between peaks and the TIP at the zero position (such as amplitude a between 632 and 631 in FIG. 6).

Using the information obtained from the TIP oscillation, the gain and phase of the system transfer function at the oscillating frequency may be calculated using the equations below, which are derived from standard Describing Functions analysis of control theory:

$$|G(j\omega)| = \frac{\pi a}{4d} \qquad \text{Equation 1}$$

$$\angle G(j\omega) = -\pi + a\sin\left(\frac{\varepsilon}{a}\right) \qquad \text{Equation 2}$$

wherein G is the system transfer function from wastegate command to TIP (i.e. transfer function of plant 220 in FIG. 2), $\omega$ is the frequency of the oscillation, $a$ is the output oscillation amplitude, d is the input (relay) amplitude (shown in FIG. 6), and $\varepsilon$ is the hysteresis size. |.| denotes system gain, $\angle$ denotes system phase, j denotes the complex variable, and asin is the arcsine function.

As one example, the wastegate feedback controller may include a PID controller as shown in FIG. 2. The wastegate feedback controller may be designed based on the Internal Model Control (IMC). The IMC controller may then be mapped to the PID controller to yield PID controller gains. An example block diagram of the IMC structure is shown in FIG. 4, wherein r(t) is input, y(t) is output, G(s) is the transfer function of plant (such as plant 220 in FIG. 2), $\hat{G}(s)$, a model of the plant (i.e., approximate process model), and Q(s), a controller block, are to be defined. As shown in FIG. 4, by rearranging the blocks, the closed loop system may be viewed as the classical feedback structure with controller given by $C(s)=Q/(1-Q\hat{G})$.

In the IMC design procedure, block Q may be selected as the inverse of the process model, i.e., $Q(s) \approx \hat{G}^{-1}(s)$. However, the process model is typically a proper transfer function and does not have a causal inverse. Therefore, to obtain a causal transfer function, the inverse model is augmented with a filter: $Q(s) \approx \hat{G}^{-1}(s)F(s)$, where F(s) is a filter with low pass characteristics. Note that with this choice of Q(s), and assuming perfect process model ($\hat{G}=G$), the closed loop transfer function from r(t) to y(t) is given by F(s); therefore, the bandwidth of F(s) dictates the bandwidth of the closed loop system and can be used as a design parameter to trade off performance and robustness. Once C(s) is designed, it can be mapped to a PID controller by matching the coefficients of powers of s in the resulting transfer function.

During the process of determining the wastegate feedback controller gains, wastegate command is in the form of a square wave. In other words, input r(t) to the IMC controller is a square wave. Under this condition, the plant at the oscillating frequency behaves like an integrator. Moreover, the frequency of relay feedback self-oscillations is close to the desired closed loop bandwidth (1-2 Hz). Therefore, the plant may be modeled with a Gain-Integrator-Delay (GID) near the frequency of relay feedback oscillations. Transfer function of the plant may be in the following form:

$$G(s) = \frac{K}{s} e^{-T_d s}, \quad \text{Equation 3}$$

where K is the modeled plant gain and $T_d$ is the modeled plant delay. Note that the actual dynamics of the plant are inherently low pass and may not be described by a GID model at all frequencies. Herein, since the GID model is identified at a frequency close to the closed loop bandwidth, the plant may be approximated with a GID model. The gain and phase of the transfer function of the plant at a frequency $\omega$ may be expressed as:

$$|G(j\omega)| = \frac{K}{\omega} \quad \text{Equation 4}$$

$$\angle G(j\omega) = -\frac{\pi}{2} - T_d \omega. \quad \text{Equation 5}$$

By equating Equations 1-2 with Equations 4-5, which are obtained from the relay feedback experiment, K and $T_d$ may be calculated:

$$K = \frac{\pi a \omega}{4d}, \quad \text{Equation 6}$$

$$T_d = \frac{1}{\omega}\left(\frac{\pi}{2} - \operatorname{asin}\left(\frac{\epsilon}{a}\right)\right), \quad \text{Equation 7}$$

Since the GID model contains an integrator, it can be shown that the IMC controller will include integral action if and only if F(s) is at least a second order filter and satisfies: $\hat{G}(s)Q(s)|_{s=0}=1$ and $$\frac{d}{ds}\left(\hat{G}(s)Q(s)\right)\bigg|_{s=0} = 0.$$

To satisfy these conditions, F(s) may be in the following form:

$$F(s) = \frac{\beta s + 1}{(\alpha s + 1)^2}, \quad \text{Equation 8}$$

where α is the bandwidth parameter (the IMC tuning knob), and β is selected as $\beta = 2\alpha + T_d$ to satisfy the above conditions. Moreover, since the GID model contains a time delay and delays are not invertible, Q(s) is selected to be an approximate inverse of the process model without the time delay:

$$Q(s) = \frac{s}{K} F(s) = \frac{s}{K} \frac{(\beta s + 1)}{(\alpha s + 1)^2} \quad \text{Equation 9}$$

Using the GID process model and the above Q(s), and employing Padé approximation of the time delay for the plant model $$e^{-T_d s} \approx \frac{-\frac{T_d}{2} s + 1}{\frac{T_d}{2} s + 1}, \quad \text{Equation 10}$$

yields the following final IMC controller:

$$C_{IMC}(s) = \frac{1}{K} \frac{(\beta s + 1)\left(\frac{T_d}{2} s + 1\right)}{s\left(\frac{\alpha^2 T_d}{2} s + \alpha^2 + 2\alpha T_d + \frac{T_d^2}{2}\right)}, \quad \text{Equation 11}$$

which contains an integrator, as desired. By matching the coefficients of powers of s in $C_{IMC}(s)$ above to a standard PID controller, PID gains may be derived:

$$C_{PID}(s) = \quad \text{Equation 12}$$
$$K_p + \frac{K_i}{s} + \frac{K_d s}{T_0 s + 1} = \frac{s^2(K_p T_0 + K_d) + s(K_p + K_i T_0) + K_i}{s(T_0 s + 1)}.$$

$$K_i = \frac{1}{K\eta}, \quad \text{Equation 13}$$

$$K_p = \frac{1}{K\eta}\left(\beta + \frac{T_d}{2} - T_0\right), \quad \text{Equation 14}$$

$$K_d = \frac{1}{K\eta}\left(T_0^2 - T_0\left(\beta + \frac{T_d}{2}\right) + \frac{\beta T_d}{2}\right), \quad \text{Equation 15}$$

wherein $K_i$, $K_p$, and $K_d$ are gains of the integral, proportional, and derivative terms of the PID controller.

$$\eta = \alpha^2 + 2\alpha T_d + \frac{T_d^2}{2}, \quad T_0 = \alpha^2 \frac{T_d}{2\eta}.$$

In the above calibration, PID controller gain may be calculated from modeled plant gain K and modeled plant delay $T_d$ according to Equations 13-15, which may further be determined from the frequency and amplitude of TIP oscillation from the relay feedback characterization based on Equations 6-7. Parameter α is the tuning knob that trades off speed of response versus robustness of the PID controller. System response may be more aggressive with smaller α. In other words, system response may be fast and may exhibit overshoot and oscillations with decreased α; and system response may be slower with increased α. As an example, α may be 2 or 3.

From Equations 6-7, modeled plant gain is a function of the amplitude and frequency of TIP oscillation, but not a function of the phase of TIP oscillation. Modeled plant delay, on the other hand, is a function of the amplitude, frequency, and phase of the TIP oscillation. Due to part-to-part variability and system degradation over time, the gain and delay of the modeled plant need to be updated over time. It is found through experiment that modeled plant gain is a strong function of the turbocharger speed. The modeled plant delay is relatively constant. For this reason, the PID controller gain lookup table is constructed as a function of the turbocharger speed. Further, modeled plant gain may be updated more frequently over time comparing to the modeled plant delay. As an example, the lookup table may be constructed by fitting 1/K as a function of the turbocharger speed, and then computing the remaining PID gains based on Equations 13-15. The proportion of increase in the gains of the integral term, proportional term, and the derivative term may be the same.

Turning back to FIG. 3, at step 311, only modeled plant gain K is updated based on the frequency and amplitude of the TIP oscillation. Then, gains of the PID controller may be updated based on frequency and amplitude of the TIP oscillation. For example, gains of the integral term, proportional term, and the derivative term may be increased with decreased frequency of TIP oscillation, and increased with decreased amplitude of TIP oscillation. The proportion of increase in the gains of the integral term, proportional term, and the derivative term may be the same. As another example, PID controller gain may be calculated based on frequency and amplitude of the TIP oscillation according to Equations 6 and Equations 13-15.

If it is determined to conduct an extensive tuning of wastegate feedback controller gains at step 308, method moves to step 309 wherein the TIP is sampled at a second frequency. The second frequency may be higher than the first frequency at step 310. By sampling at a higher frequency, phase of the TIP oscillation may be more accurately identified. The frequency, amplitude, and phase of the TIP oscillation may be used to update both the modeled plant gain K and modeled plant delay $T_d$ based on Equations 6-7. Then, each of the PID controller gain is updated according to Equations 13-15. In this way, method 300 may sample the TIP signal at high frequency less often, only when the modeled plant delay needs to be updated, so that controller resources may be reserved to execute other processes. At step 312, modeled plant delay $T_d$ is updated based on the frequency, amplitude, and phase of the TIP oscillation, and PID controller gains updated accordingly.

At step 313, the wastegate is actuated based on the updated lookup table.

FIG. 5 shows an example method 500 for in-factory calibration of the lookup table. The lookup table stores wastegate feedback controller gains calibrated at each turbocharger speed within a predetermined list of turbocharger speeds. Similar to step 311 of FIG. 3, the controller gain at each turbocharger speed may be determined through relay feedback.

At step 501, the turbocharger is set to run at a predetermined turbocharger speed. Then, an oscillation of wastegate position is induced at step 502. The TIP may oscillate responsive to the wastegate position oscillation.

At step 503, the TIP is sampled. As an example, the TIP may be sampled at a frequency higher or equal to the second frequency in step 309 of FIG. 3. The wastegate feedback controller gains may then be calculated based on frequency, amplitude, and phase of the sampled TIP oscillation at step 504. As an example, the gains may be calculated as demonstrated in step 312 of FIG. 3. At step 505, turbocharger speed and corresponding controller gain may be saved as a lookup table in the non-transitory memory of an engine controller, such as engine controller 12 in FIG. 1.

FIG. 6 illustrates the variation of engine parameters while updating the wastegate feedback controller gain during engine operation. The x-axes represent time and increase from left to right.

From $T_0$ to $T_1$, torque demand 601 remains between thresholds 610 and 611. Since the variation of torque demand is within a threshold Th for a duration from $T_0$ to $T_1$, engine controller (such as engine controller 12 in FIG. 1) may determine the engine is during steady engine operation. The wastegate command 602 may be the output of a PID controller (such as PID controller 210 in FIG. 2). As an example, increased wastegate command corresponds to increased wastegate opening. In another example, increased wastegate command corresponds to decreased wastegate opening. Throttle opening 604 is adjusted to achieve a MAP corresponding to the requested torque.

At $T_1$, if the controller determines that the wastegate feedback controller gain needs to be updated, wastegate command generated from a relay function (such as relay function 201 in FIG. 2) is sent to actuate the wastegate. For example, the wastegate command may be a switching square wave. Consequently, TIP oscillates relative to a zero position 631. To maintain a constant MAP 605, the engine controller adjusts throttle position by actuate its actuator, causing throttle position oscillation. As an example, the throttle position may be oscillated with the same phase and frequency as the wastegate command. Due to throttle position oscillation, MAP maintains relatively constant while TIP oscillates from $T_1$ to $T_2$.

At $T_2$, in response to the engine torque demand 601 increases to be above threshold 610, the engine controller stops the oscillation in wastegate position and throttle position. As another example, the engine controller may stop the oscillation in wastegate position responsive to a change in torque demand greater than a threshold. As yet another example, the engine controller may stop the oscillation in wastegate position responsive to a time derivative of torque demand greater than a threshold. In another example, the engine controller may stop the oscillation in wastegate position responsive to a high pass filtered value of an engine airflow estimate or measurement greater than a positive threshold or less than a negative threshold. The wastegate command is the output of the PID controller, and the throttle is actuated to meet a required MAP.

In this way, wastegate feedback controller parameters may be tuned during engine operation to compensate the part-to-part variation of the engine system and the system degradation overtime. Gain of each PID controller term may be calculated directly based on the frequency, amplitude, and the phase of the TIP oscillation without complicated tuning process.

Technical effect of modeling the engine system as a GID model is that the PID controller gains may be directly mapped based on the TIP oscillation. Technical effect of sampling the TIP signal with low frequency if the duration from last lookup table update is less than a threshold is that controller resources may be saved and allocated to other operations. Technical effect of updating the lookup table with the frequency and amplitude of the TIP oscillation but not phase, if the duration from last lookup table update is less than a threshold is that the updated lookup table may be determined quickly. Technical effect of sampling the TIP signal with high frequency if the duration from last lookup table update is longer than a threshold is that phase of the TIP may be accurately determined for calculating a term of model system delay. Technical effect of updating the wastegate feedback controller parameters during steady engine operation is that the wastegate feedback controller may be tuned with minimal effect on vehicle drivability. Technical effect of adjusting throttle position responsive to wastegate command is reducing fluctuation in manifold air pressure. Technical effect of updating the modeled plant gain more frequently than the modeled plant delay is that PID controller gain may be quickly determined.

As one embodiment, a method for an engine, comprising: during steady engine operation, inducing a boost pressure oscillation by actuating a wastegate, and compensating a manifold air pressure with a corresponding throttle oscillation; and updating a gain of a wastegate feedback controller based on the boost pressure oscillation. In a first example of the method, further comprising updating the gain of the wastegate feedback controller based on amplitude and frequency of the boost pressure oscillation, wherein the amplitude and frequency of the boost pressure oscillation is determined based on peaks and zero-crossings of the boost pressure oscillation. A second example of the method optionally includes the first example and further includes increasing the gain of the wastegate feedback controller when an amplitude of the boost pressure decreases. A third example of the method optionally includes one or more of the first and second examples, and further includes calculating the gain of the wastegate feedback controller by modeling an engine process as a gain-integrator-delay model. A fourth example of the method optionally includes one or more of the first through third examples, and further includes, wherein the wastegate feedback controller includes a PID controller. A fifth example of the method optionally includes one or more of the first through fourth examples, and further includes, updating a proportional gain and a derivative gain of the PID controller with a turning knob to trade off response speed versus robustness of the PID controller. A sixth example of the method optionally includes one or more of the first through fifth examples, and further includes, wherein the steady engine operation includes variation of a torque demand is smaller than a threshold over a predetermined time period. A seventh example of the method optionally includes one or more of the first through sixth examples, and further includes, stopping the boost pressure oscillation and throttle oscillation responsive to a change of torque demand greater than a threshold. An eighth example of the method optionally includes one or more of the first through seventh examples, and further includes, determining the throttle oscillation based on a wastegate position.

As another embodiment, a method for an engine, comprising: determining a gain of a wastegate feedback controller based on a turbocharger speed via a lookup table; during steady engine operation, actuating the wastegate to induce an oscillation in wastegate position; and updating the lookup table based on an oscillation in boost pressure. In a first example of the method, further comprising decreasing the gain with increased turbocharger speed. A second example of the method optionally includes the first example and further includes determining the gain based on amplitude and frequency of the oscillation in boost pressure. A third example of the method optionally includes one or more of the first and second examples, and further includes, wherein the lookup table is updated after a first time period. A fourth example of the method optionally includes one or more of the first through third examples, and further includes, wherein the gain of the wastegate feedback controller is increased with decreased frequency of the boost pressure oscillation, and is increased with decreased amplitude of the boost pressure oscillation. A fifth example of the method optionally includes one or more of the first through fourth examples, and further includes, updating the lookup table based on a phase of the oscillation in boost pressure over a second time period, and the second time period is longer than the first time period.

As yet another embodiment, an engine system, comprising: a turbocharger; a wastegate coupled to a turbine of the turbocharger; a throttle controlling air intake to an engine intake manifold; a sensor upstream of the throttle for sensing a boost pressure; a sensor coupled to the engine intake manifold for sensing a manifold air pressure; and an engine controller configured with computer readable instructions stored on non-transitory memory for: actuating the wastegate via a wastegate feedback controller; during steady engine operation, actuating the wastegate to induce boost pressure oscillation, and actuating the throttle responsive to the boost pressure oscillation; and updating the gain of the wastegate feedback controller based on the boost pressure oscillation. In a first example of the system, wherein the engine controller is further configured to updating the gain of the wastegate feedback controller based on peaks and zero-crossings of the sensed boost pressure. A second example of the system optionally includes the first example and further includes, wherein the throttle is actuated to maintain a constant manifold air pressure. A third example of the method optionally includes one or more of the first and second examples, further include an electric motor, and the engine controller is further configured for using electric motor to compensate impact of boost pressure oscillation on engine torque output. A fourth example of the method optionally includes one or more of the first through third examples, and further includes, wherein the engine controller is further configured for oscillating torque generated by a generator to maintain a constant vehicle torque output.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
   during steady engine operation, inducing a boost pressure oscillation by actuating a wastegate, and compensating a manifold air pressure with a corresponding throttle oscillation; and
   updating a gain of a wastegate feedback controller based on the boost pressure oscillation.

2. The method of claim 1, further comprising updating the gain of the wastegate feedback controller based on amplitude and frequency of the boost pressure oscillation, wherein the frequency of the boost pressure oscillation is determined based on peaks and zero-crossings of the boost pressure oscillation; and adjusting a signal sent to a wastegate actuator based on the updated gain.

3. The method of claim 1, further comprising increasing the gain of the wastegate feedback controller when amplitude of the boost pressure oscillation decreases.

4. The method of claim 2 wherein the wastegate is controlled with the updated gain.

5. The method of claim 1, wherein the wastegate feedback controller includes a PID controller.

6. The method of claim 5, further comprising updating a proportional gain, integral gain, and a derivative gain of the PID controller with a tuning knob to trade off response speed versus robustness of the PID controller.

7. The method of claim 1, wherein the steady engine operation includes variation of a torque demand being smaller than a threshold over a predetermined time period.

8. The method of claim 1, further comprising stopping the boost pressure oscillation and throttle oscillation responsive to a change of torque demand greater than a threshold.

9. The method of claim 1, further comprising determining the throttle oscillation based on a wastegate position.

10. A method for an engine, comprising:
    determining a gain of a wastegate feedback controller based on a turbocharger speed via a lookup table;
    during steady engine operation, actuating a wastegate to induce an oscillation in wastegate position; and
    updating the lookup table based on an oscillation in boost pressure.

11. The method of claim 10, further comprising decreasing the gain with increased turbocharger speed.

12. The method of claim 10, further comprising determining the gain based on amplitude and frequency of the oscillation in boost pressure.

13. The method of claim 12, wherein the lookup table is updated after a first time period.

14. The method of claim 13, wherein the gain of the wastegate feedback controller is increased with decreased frequency of the boost pressure oscillation, and is increased with decreased amplitude of the boost pressure oscillation.

15. The method of claim 13, further comprising updating the lookup table based on a phase of the oscillation in boost pressure over a second time period, and the second time period is longer than the first time period.

\* \* \* \* \*